United States Patent [19]
Muir

[11] Patent Number: 5,481,403
[45] Date of Patent: Jan. 2, 1996

[54] DRY SILVER PHOTOGRAPHIC IMAGING DEVICE AND METHOD

[75] Inventor: Max K. Muir, Payson, Ariz.

[73] Assignee: Volt Information Sciences, Inc., New York, N.Y.

[21] Appl. No.: 148,726

[22] Filed: Nov. 8, 1993

Related U.S. Application Data

[63] Continuation-in-part of Ser. No. 72,199, Jun. 3, 1993, abandoned.

[51] Int. Cl.$^6$ .............................. G02B 27/10; G02B 27/14
[52] U.S. Cl. ............................................. 359/618; 359/634
[58] Field of Search ..................................... 359/618, 634, 359/618; 353/31, 48, 51

[56] References Cited

U.S. PATENT DOCUMENTS

| | | | |
|---|---|---|---|
| 3,578,836 | 5/1971 | Hannan | 359/27 |
| 3,881,801 | 5/1975 | Bechtold | 350/6 |
| 4,089,016 | 5/1978 | Orlando | 354/75 |
| 4,277,154 | 7/1981 | Sakabinos | 354/5 |
| 4,305,640 | 12/1981 | Cullis et al. | 350/96 |
| 4,333,153 | 6/1982 | Mletzko et al. | 364/523 |
| 4,931,637 | 6/1990 | Saccari et al. | 250/235 |
| 4,961,079 | 10/1990 | Owens | 346/108 |
| 5,113,279 | 5/1992 | Hanamoto | 359/196 |
| 5,210,643 | 5/1993 | Fujii | 359/638 |
| 5,255,082 | 10/1993 | Tamada | 358/60 |

OTHER PUBLICATIONS

*Imaging Processes And Materials, Neblette's Eighth Edition,* Van Nostrand Reinhold, 1989, pp. 279–291.

*Primary Examiner*—Georgia Y. Epps
*Assistant Examiner*—Ricky Mack
*Attorney, Agent, or Firm*—Kenyon & Kenyon

[57] ABSTRACT

In a dry silver photographic imaging device and method, two laser beams are generated. The laser beams are then modulated. One of the modulated laser beams is reflected and the other modulated laser beam is transmitted. The two beams are then swept across a dry silver film in order to form a desired image on the film.

14 Claims, 2 Drawing Sheets

DRY SILVER PHOTOGRAPHIC IMAGING DEVICE AND METHOD

CROSS-REFERENCE TO RELATED APPLICATION

This application is a continuation-in-part of U.S. Ser. No. 08/072,199, filed Jun. 3, 1993 now abandoned.

FIELD OF THE INVENTION

The present invention relates to photographic devices and methods and in particular to a device and method for providing an image on a photographic media.

BACKGROUND OF THE INVENTION

Imaging systems are used, for example, in the printing and publishing industry to print magazines, books, etc. Conventional systems include an imager which uses a laser to sensitize (expose) a photo-sensitive photographic media, e.g. conventional photographic film, in a pattern corresponding to the image desired to be printed. Sensitized film is then developed by subjecting it to a photographic aqueous chemical solution in a photographic processor, which may be mechanically coupled to the imager.

The two-dimensional images on the developed film are then photographically transferred to printing plates for use in the printing process. In particular, in contact printing, for example, the developed film is held in contact with the printing plates while the entire assembly is exposed to light.

Because of environmental considerations, however, it is becoming increasingly expensive to properly dispose of the aqueous chemical solution left-over after development of the film. Indeed, it may cost more to dispose of these solutions than it does to purchase them.

In order to solve this problem, a dry silver photographic media, and in particular a dry silver film, which can be photographically developed using heat rather than an aqueous solution, has been produced. In particular, thermally processed silver material (TPSM) is coated in a non-gelatin base to a polyester substrate. The coating is a few microns thick. The film is then exposed to the laser beam of an imager, similar to the way silver halide material is exposed. Heating the exposed film allows catalytic action of the exposed silver crystal to migrate to the surrounding silver soap molecules and cause them to produce a high contrast image —not unlike conventional silver halide film images. This process is described in detail in *Imaging Processes And Materials, Neblette's Eighth Edition*, Van Nostrand Reinhold, 1989, pp. 279–291, which is hereby expressly incorporated by reference herein. When the thermal process is complete, the film is cooled and then can be used to transfer the image to conventional printing plates.

Such dry silver film, however, requires significantly higher amounts of laser light energy for sensitization (i.e., for sensitizing the silver particles) than does conventional photographic film developed through the use of an aqueous solution. Indeed, imagers for such conventional film do not provide laser light of sufficient energy to sensitize dry silver film.

The use of a more powerful laser in a conventional imager, to replace the typical laser, is not practical because the more powerful laser would occupy a significantly larger amount of space and would be considerably more expensive.

SUMMARY OF THE INVENTION

The present invention provides a dry silver photographic imaging device and method. First and second lasers generate first and second polarized laser beams, respectively. The first laser beam is preferably vertically polarized, and the second laser beam is preferably horizontally polarized. First and second modulators modulate the first and second laser beams, respectively, in response to respective control signals from an image processor.

A specially coated beam combiner efficiently reflects the modulated first laser beam and transmits the modulated second laser beam. An oscillating mirror then sweeps the two laser beams side-to-side across a dry silver film for sensitizing preselected silver particles of the film in order to form a desired image on the film. The imager according to the present invention delivers sufficient energy to the film in order to sensitize the silver particles, and yet is relatively inexpensive and occupies a relatively small amount of space.

DETAILED DESCRIPTION

Figure 1:
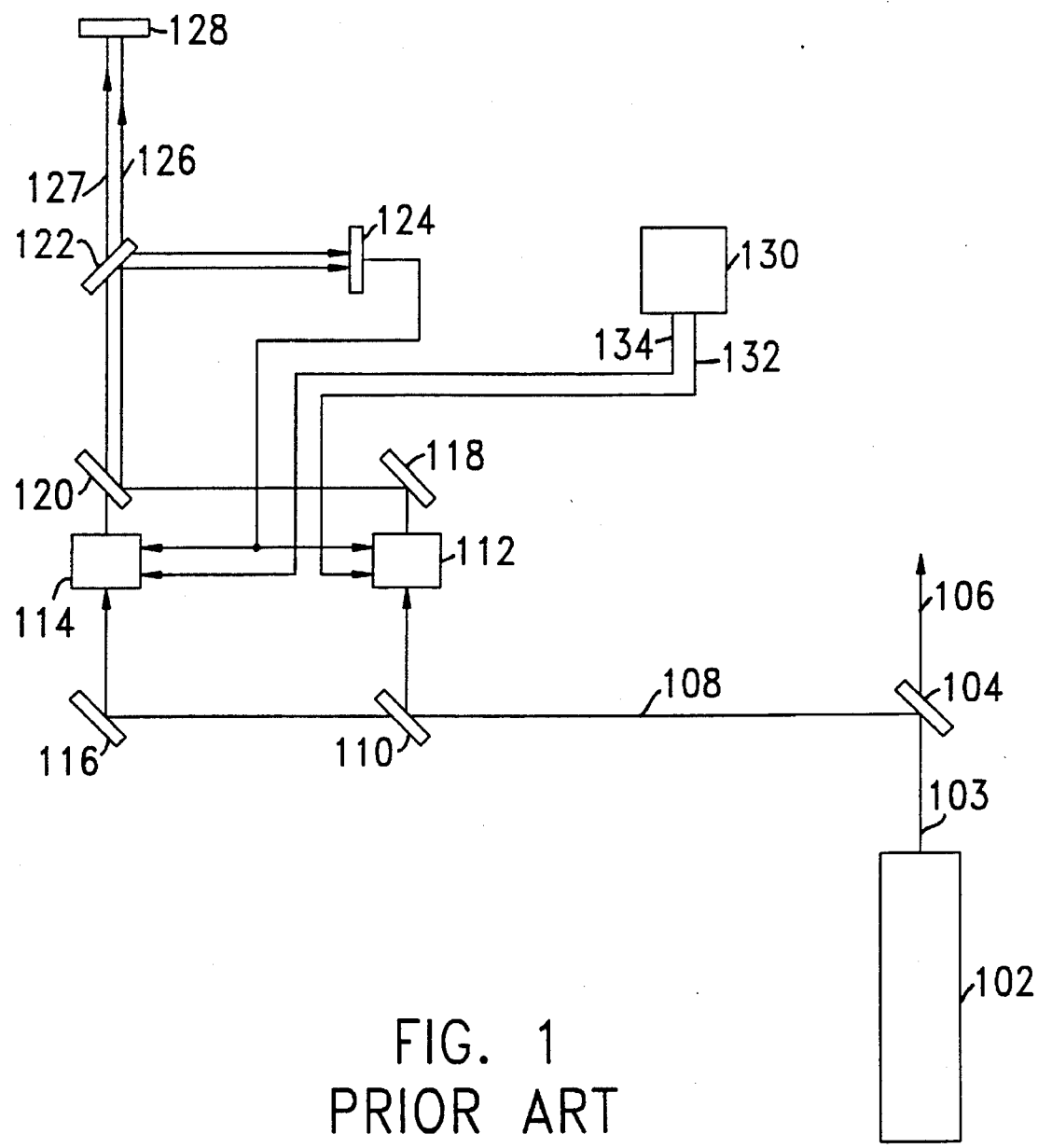
FIG. 1 shows a conventional imager.

Referring to FIG. 1, there is shown an imager of the prior art. In particular, FIG. 1 shows a laser raster imager for exposing conventional photographic film that is developed in a conventional way through the use of an aqueous solution. This imager may be a PelBox 108S supplied by ECRM, whose address is 205 Burlington Road, Bedford, Mass. 01730.

The imager includes a helium neon laser 102 that transmits a vertically-polarized, red laser beam 103 to a beam-splitter mirror 104, which splits the laser beam 103 into a transmitted beam, i.e. a grating beam 106, and a reflected beam 108. The reflected beam 108 strikes another beam-splitter mirror 110, which partially reflects the beam 108 to a first acousto-optic modulator 112, and partially transmits the beam 108 to a second acousto-optic modulator 114 through a reflecting mirror 116.

The beam from the first modulator 112 is reflected by a reflecting mirror 118 to a beam combiner 120, which also receives the beam from the second modulator 114. The beam combiner 120 transmits the beam from the second modulator 114 and reflects the beam from the first modulator 112 (i.e., from the reflecting mirror 118) to another beam-splitter mirror 122. The beam-splitter mirror 122 partially transmits these two beams as record beams 126, 127 to an oscillating mirror 128 and partially reflects these two beams to intensity sampling diode and power control circuitry 124.

An output of intensity sampling diode and power control circuitry 124 is fed back to each of the first and second modulators 112, 114. Outputs of a raster image processor 130 are also fed to the first and second modulators 112 and 114 over lines 132 and 134, respectively.

The operation of the conventional laser raster imager of FIG. 1 is now clarified. A roll of film is typically fed past the imager, and in particular in the vicinity of the oscillating mirror 128. Simultaneously, the oscillating mirror 128 oscillates in order to direct the record beams 126, 127 so as to move (trace) them across the film in a direction perpendicular to the direction of movement of the film, and in particular back and forth between the outside edges of the film. Specifically, in the configuration shown in FIG. 1, the film moves, for example, left to right (or vice-versa) across the page, while the finely-focused record beams move in a direction perpendicular to the page, back and forth between the outside edges of the film.

The individual traces across the film are commonly referred to as scan lines. Because there are two record beams, two scan lines are traced simultaneously, in order to increase the speed of the imaging. The medium is therefore moved the distance of two scan lines for the next pair of traces once the record beams have crossed from one outside edge of the film to the other, i.e., once the record beams have traversed the entire width of the film.

Each scan line of the film includes a plurality of pixels, for example, 1000 pixels/inch. Obviously, whether a particular pixel should be "on" or "off" is a function of whether that particular location of the film should be black or clear, in order to form the desired two-dimensional raster image. The raster image processor 130 stores a binary map, for example, of which pixels of each scan line should be sensitized (i.e., should be on) and which should not be sensitized (i.e., should be off).

As a record beam (record beam 126, for example), as directed by the oscillating mirror 128, sweeps across the film, the raster image processor 130 controls the corresponding modulator (modulator 112 over line 132, in this case) to allow the modulator to generate the first-order diffraction beam which passes through the optical path or, on the other hand, to retain the beam energy in the zero-order of diffraction which is blocked from passing through the optical path (i.e., to turn the record beam on or off) for each individual pixel traversed. When the laser beam has high energy content in the first-order part striking the pixel, the pixel is sensitized (i.e., is turned on). On the other hand, when the beam has low energy in the first-order part, the pixel is non-sensitized (i.e., remains off).

The grating beam 106 is used to precisely synchronize the digital clocking of the raster data from the raster image processor 130 (i.e., the data for turning the record beams on and off) with the sweeping of the record beams across the film. In particular, a photo-sensitive optical grating positioned along the width of the film has a plurality of subdivisions. The grating may be, for example, a piece of glass with 100 evenly spaced scores per inch.

The grating beam 106 sweeps across the grating, in unison with the record beams sweeping across the film, through the use of an oscillating mirror which may be, but need not be, the same oscillating mirror 128 used for the record beams 126, 127. The detection of the grating beam 106 traversing a particular subdivision of the grating is used to precisely determine the time at which the record beams traverse corresponding pixels and, thus, the times at which the raster image processor 130 should signal the modulators to turn the record beams on and off.

The intensity sampling diode and power control circuitry 124 controls the amount of power contained in the record beams. In particular, each of the first and second modulators 112, 114 has an exposure control setting which determines the portion (percentage) of energy of the laser beam in the first-order part striking a pixel when it is desired that the record beam be on. The exposure control setting is a function of the particular type of film being used, and is manually set before normal operation begins.

The intensity sampling diode and power control circuitry 124 receives a fixed portion of the record beam energy. If this fixed portion of energy indicates that the present beam energy deviates from that set initially via the exposure control setting, the circuitry 124 feeds back a fine-tuning signal to the modulator in order to generally maintain that initial exposure control setting value.

The conventional imager of FIG. 1 does not provide record beams of sufficient energy to sensitize the silver particles of a dry silver film, for example. One of the reasons for this is that only a small percentage of the total energy of the laser light generated by the laser 102 is actually delivered to the film through the record beams, as set forth below. The use of a more powerful laser in this imager is not a practical solution to this problem because such a laser would occupy a significantly larger amount of space and would considerably increase the cost of the imager.

The conventional imager of FIG. 1 is relatively inefficient in its use of laser beam energy. The beam-splitter mirror 104 transmits approximately 20% of the energy of the original laser beam 103 to form the grating beam 106. The reflected beam 108, which therefore contains 80% of the original energy, is then split into two beams by the beam-splitter mirror 110, leaving only 40% of the original energy at each of the modulators. The first and second modulators 112, 114 are approximately 40% efficient, causing each of the beams at the inputs of the beam combiner 120 to carry approximately 16% of the original energy.

In addition, the beam combiner 120 is only 50% efficient because it has to reflect and transmit two laser light beams that are polarized in the same manner because they are generated by the same laser light source, i.e., laser 102. This leaves only 8% of the original laser beam energy in each of the laser beams reaching the beam-splitter mirror 122. The beam-splitter mirror 122 reflects 20% of the energy to the intensity sampling diode and power control circuitry 124. As a result, each of the record beams 126, 127 transmitted to the oscillating mirror 128 and, thus, to the film contains only about 6.4% (i.e., 80% of 8%) of the energy of the original laser beam 103 generated by the laser 102.

Figure 2:
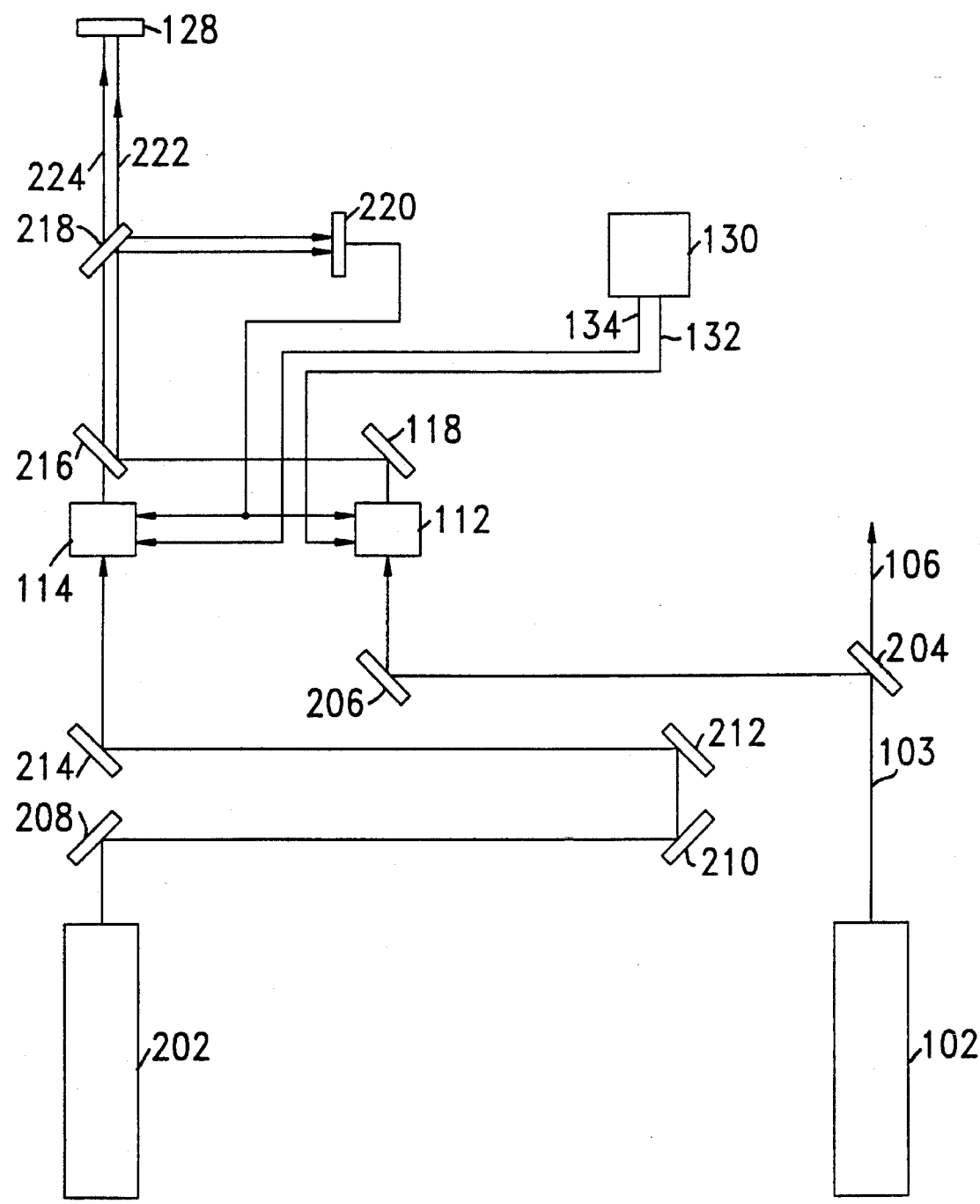
FIG. 2 shows an embodiment of the imager according to the present invention.

In contrast to the conventional imager shown in FIG. 1, the imager according to the present invention shown in FIG. 2 uses two lasers, each of which is preferably of the same type as that shown in FIG. 1. Elements of FIG. 2 which are the same as those shown in FIG. 1 are identified with like reference numerals.

Referring to FIG. 2, a first laser 102 (preferably a helium neon laser) transmits a first laser beam 103 to a beam-splitter mirror 204 which partially transmits the beam 103 as a grating beam 106 and partially reflects the beam to a first acousto-optic modulator 112 via a reflecting mirror 206. A second laser 202 (preferably also a helium neon laser) transmits a second laser beam to a second acousto-optic modulator 114, preferably through four reflecting mirrors 208, 210, 212, 214, although these mirrors are not required.

A beam combiner 216 receives the beam from the first modulator 112, via a reflecting mirror 118, and the beam from the second modulator 114. The beam combiner 216 reflects the beam from the first modulator 112 and transmits the beam from the second modulator 114 to a beam-splitter mirror 218. The beam-splitter mirror 218 partially transmits these two beams as record beams 222, 224 to an oscillating mirror 128 (and ultimately to a dry silver film, for example) and partially reflects these two beams to intensity sampling diode and power control circuitry 220, which is analogous to that described above with reference to FIG. 1.

The imager according to the present invention shown in FIG. 2 functions analogously to the conventional imager shown in FIG. 1, except as now described. The first and second lasers 102, 202 are oriented such that there is a 90° rotational difference in phase between the first and second laser beams. Preferably, the first laser 102 is oriented (e.g., with its power cord at the bottom) so as to generate vertically-polarized laser light, while the second laser 202 is oriented (e.g., with its power cord at the side) so as to generate horizontally-polarized laser light.

The use of two lasers that generate respective beams of laser light that are polarized 90° apart is advantageous (over the single-laser conventional imager of FIG. 1) because it allows for the use of a specially coated beam combiner 216 that reflects the first type of beam at a much higher efficiency than the second type of beam and, at the same time, transmits the second type of beam at a much higher efficiency than the first type of beam. The imager according to the present invention shown in FIG. 2 exploits this quality of the beam combiner 216 in order to deliver record beams 222, 224 that contain a significantly higher percentage of the energy contained in the original laser beams generated by the lasers, as now described in further detail.

The beam-splitter mirror 204 transmits only about 10% of the energy of the first laser beam 103, leaving 90% of the energy in the beam reaching the first modulator 112. Because the first modulator 112 is 40% efficient, the output of the first modulator 112 contains approximately 36% of the energy of the original first laser beam 103. Even though the laser beam reaching the second modulator 114 contains virtually the same amount of energy as the original second laser beam generated by the second laser 202, the output of the second modulator 114 likewise contains approximately 36% of the energy of the original second laser beam because the efficiency of the second modulator 114 is slightly lowered to ensure that the outputs of the modulators 112, 114 contain essentially the same amount of energy.

The beam combiner 216 has a special coating that allows it to reflect approximately 90% of the vertically-polarized laser light from the first modulator 112 and to transmit approximately 90% of the horizontally-polarized laser light from the second modulator 114. Such a beam combiner is available as model no. 93-244 from Melles Griot, a company whose address is 1770 Kettering Street, Irvine, Calif. 92714.

As a result, the beams received by the beam-splitter mirror 218 contain approximately 32% of the original laser beam energy. The beam-splitter mirror 218 reflects only about 10% of the energy for power control. Therefore, each of the record beams 222, 224 transmitted to the oscillating mirror 128 and, thus, delivered to the dry silver film, for example, contains approximately 28.8% of the energy contained in the original laser beam generated by the corresponding laser 102, 202.

In contrast to the amount of energy contained in the record beams transmitted by the conventional imager of FIG. 1, the amount of energy supplied to the dry silver film by the imager according to the present invention shown in FIG. 2 is more than sufficient to sensitize silver particles of the film. Indeed, the overall efficiency of the imager according to the present invention of FIG. 2 is about four to five times greater than that of the conventional imager of FIG. 1, in that the record beams of FIG. 2 carry approximately 28.8% of the original laser energy, while the record beams of FIG. 1 carry approximately 6.4% of the original laser energy.

In addition, the two-laser imager according to the present invention would offer significant advantages over a conventional single-laser imager modified so as to include a more powerful (substitute) laser. In particular, the imager according to the present invention would occupy significantly less space and would be considerably less expensive than such a modified conventional imager.

What is claimed is:

1. A photographic imager comprising:
    a first laser for generating a first laser beam having a first polarization;
    a second laser for generating a second laser beam having a second polarization different from the first polarization; and
    a beam combiner for receiving the first and second laser beams, the beam combiner reflecting the first laser beam and transmitting the second laser beam such that the reflected first laser beam is substantially separated from the transmitted second laser beam, the beam combiner directing the reflected first laser beam and the transmitted second laser beam toward a photographic media to sensitize at least one portion of the photographic media.

2. The photographic imager according to claim 1, wherein the photographic media includes a dry silver film having a plurality of silver particles.

3. The photographic imager according to claim 1, wherein each of the first and second lasers is a helium neon laser.

4. The photographic imager according to claim 1, wherein the first and second laser beams are polarized 90° apart.

5. The photographic imager according to claim 1, wherein the first laser beam is vertically polarized and the second laser beam is horizontally polarized.

6. The photographic imager according to claim 1, further comprising:
    a first modulator disposed between the first laser and the beam combiner; and
    a second modulator disposed between the second laser and the beam combiner.

7. The photographic imager according to claim 6, wherein each of the first and second modulators is an acousto-optic modulator.

8. A device for providing an image on a photographic media, comprising:
    means for generating a polarized first laser beam;
    means for modulating the first laser beam;
    means for generating a polarized second laser beam, the first and second laser beams having polarizations shifted in phase;
    means for modulating the second laser beam; and
    means for reflecting the modulated first laser beam and for transmitting the modulated second laser beam such that the reflected first laser beam and the transmitted second laser beam are distinct and are directed to first and second portions, respectively, of the photographic media to provide the image on the photographic media.

9. The device according to claim 8, further comprising a beam-splitter mirror disposed between the means for generating the first laser beam and the means for modulating the first laser beam.

10. The device according to claim 8, further comprising a beam-splitter mirror for receiving the reflected first laser beam and the transmitted second laser beam.

11. A method of providing an image on a photographic media, comprising the steps of:

generating a polarized first laser beam;

modulating the first laser beam;

generating a polarized second laser beam, the first and second laser beams having polarizations shifted in phase;

modulating the second laser beam;

reflecting the modulated first laser beam toward a first portion of the photographic media; and transmitting the modulated second laser beam toward a second portion of the photographic media different from the first portion of the photographic media.

12. The method according to claim 11, wherein the photographic media includes a dry silver film.

13. The method according to claim 11, wherein the first laser beam is vertically polarized and the second laser beam is horizontally polarized.

14. The method according to claim 11, further comprising the steps of:

splitting the first laser beam; and splitting each of the reflected first laser beam and the transmitted second laser beam.

* * * * *